United States Patent [19]

Rice et al.

[11] 3,927,140

[45] Dec. 16, 1975

[54] ADHESIVE COMPOSITION

[75] Inventors: James T. Rice; Chia M. Chen, both of Athens, Ga.

[73] Assignee: Research Corporation, New York, N.Y.

[22] Filed: Oct. 24, 1973

[21] Appl. No.: 409,312

[52] U.S. Cl.............. 260/838; 260/29.3; 260/53 R; 260/57 R
[51] Int. Cl.² ......................................... C08L 61/06
[58] Field of Search ............................ 260/838, 29.3

[56] References Cited
UNITED STATES PATENTS

| | | | |
|---|---|---|---|
| 2,456,006 | 12/1948 | Hickler | 161/259 |
| 2,593,926 | 4/1952 | Simons | 260/838 |
| 2,620,288 | 12/1952 | Schrader | 260/838 |
| 2,620,321 | 12/1952 | Schrader | 260/838 |
| 2,631,098 | 3/1953 | Redfern | 161/262 |
| 2,875,179 | 2/1959 | Freeman | 260/838 |
| 3,207,652 | 9/1965 | Shannon | 260/838 |
| 3,410,718 | 11/1968 | Smith | 260/838 |
| 3,658,622 | 4/1972 | Horowitz | 260/29.3 |
| 3,663,491 | 5/1972 | Kibler | 260/29.3 |
| 3,767,612 | 10/1973 | Grazen | 260/838 |
| 3,817,890 | 6/1974 | Rouzier | 260/29.3 |
| 3,852,232 | 12/1974 | Bowman | 260/29.3 |

*Primary Examiner*—Paul Lieberman
*Attorney, Agent, or Firm*—Oblon, Fisher, Spivak, McClelland & Maier

[57] ABSTRACT

An aldehyde condensation copolymer is disclosed which is formed by co-condensing
  a. 90% – 10% by weight of an essentially linear and non-crosslinkable aldehyde condensation prepolymer with
  b. 10% – 90% by weight of a highly thermosettable and crosslinkable aldehyde condensation prepolymer.

5 Claims, No Drawings

ADHESIVE COMPOSITION

BACKGROUND OF THE INVENTION

1. Field of the Invention

This invention relates generally to unique aldehyde condensation resins, and more particularly to aldehyde condensation resins which are useful as adhesives and binders.

2. Description of the Prior Art

Aldehyde condensation resins, and in particular, phenol-aldehyde resins, are commonly used as adhesives in the formation of plywood, particle board and hardboard.

One difficulty which the aldehyde resin adhesive industry has been concerned with is the prevention of dry-out of the adhesive during assembly of the contacted pieces being bonded. In the plywood industry in particular, the aldehyde resin adhesives are usually applied in the form of a viscous, water containing mixture or solution, or in some cases, in the form of an alcoholic or other hydrophilic solution. There is a tendency however, for many materials to absorb or dessicate the water or solvent medium, which results in poor adhesive bonding with the adjacently applied substrates. Recently, this problem has become accentuated by the increased use of southern pine woods in plywood formation. Such woods, however, generally possess highly absorbent characteristics. Normally, a lag time of 10 – 25 minutes will occur between the time the adhesive is applied to the individual veneers forming the plywood panel layup, and the time that heat and pressure are applied to convert the aldehyde resin to its "C" stage or thermoset and cured condition. During this lag, or assembly time, most presently commercial water containing aldehyde adhesives will become at least partially dessicated.

Efforts have been made in the prior art to reduce this bond dryout tendency, but no completely satisfactory solution to the problem has been reported. Most prior art attempts have concentrated on varying the quantity of catalyst used in forming the resin, or in varying the ratios of resin components. For instance, in phenol-formaldehyde resins, which are the most common resin used in such adhesives, efforts have been made to solve the bond dryout problem by varying the sodium hydroxide content, or by varying the phenol/formaldehyde ratios. However, such efforts have largely resulted in the formation of resins which are either too easily dried out and hence form quite brittle adhesive layers, or which have excessive flow characteristics hence causing the resin to easily flow from the bonding site and perhaps be too slow in curing as well.

U.S. Pat. No. 1,960,176 disclosed procedures for preparing a phenolformaldehyde resin solution which could be impregnated into tissue paper and dried to produce a supported dry bonding film glueline for making hot pressed laminated products from wood veneers. This resin is indicated as having the property of thermoplasticity which can be set to a hard infusible, permanent form at temperatures of about 130°C. The complexity of the total preparation and slowness of the cure mitigates against its direct use as a plywood adhesive.

Efforts at physically combining a high thermosetting phenol-formaldehyde resin, with high thermoplastic phenol-formaldehyde resins have also not been fully successful, since such combinations have resulted in poor or inadequate adhesive bonding. For instance, when adhesives such as reported in U.S. Pat. Nos. 2,456,006, and 2,631,097 in which more or less, thermosetting and thermoplastic resins are reportedly used in combination, the quality of the adhesive bond was not found to be superior to homopolymers of comparable composition.

It was also suggested to prevent bond dryout by incorporation of viscosity enhancers, such as starch into the adhesive (U.S. Pat. No. 3,544,493), however, such efforts have also not proven to be fully satisfactory.

Accordingly, a need continues to exist for an adhesive which will circumvent the bond dry-out problem, even during long periods of assembly time.

SUMMARY OF THE INVENTION

Accordingly, it is one object of this invention to provide an aldehyde condensation resin which can be used as an adhesive which is capable of circumventing the bond dry-out problem when brought into contact with absorbent substrates.

It is further an object of this invention to provide an adhesive which has good dry flow properties, and yet which is fast curing to an infusable thermoset condition.

These and other objects, as will become more readily apparent, have been attained by providing an aldehyde condensation copolymer which is formed by co-condensing a. 90% – 10% by weight of an essentially linear and non-crosslinkable aldehyde condensation prepolymer, with b. 10% – 90% by weight of a highly thermosettable and crosslinkable aldehyde condensation prepolymer.

DESCRIPTION OF THE PREFERRED EMBODIMENTS

The adhesive of the present invention is formed by copolymerizing a combination of a strongly crosslinkable aldehyde prepolymer with an essential linear and non-crosslinkable aldehyde prepolymer.

The aldehyde resins used as prepolymers in this invention are those of the condensation type. The condensation reaction can involve an aldehyde such as formaldehyde, acetaldehyde, benzaldehyde, propionaldehyde, butyraldehyde, furfuraldehyde, or mixtures thereof, for instance a mixture of formaldehyde and butyraldehyde. Preferred is formaldehyde, but, of course, paraformaldehyde may be used as a source of formaldehyde.

The aldehyde may be condensed with a phenolic compound, such as phenol, resorcinol, or other phenolic, such as xylenol and cresol, or an amine, such as urea, melamine, guanamine or the like. The preferred phenolic is phenol.

Basically, this invention centers around the concept of copolymerizing condensation polymer resins. According to the present invention, separate aldehyde condensation prepolymers are formed from the above components and then are copolymerized to form a finished resin of improved adhesive characteristics. Specifically, one of the prepolymer components is formed in an approximately 1 : 1 mole ratio of aldehyde to phenolic, amine or urea so as to produce, from monomer having a functionality of approximately two, a prepolymer which is essentially linear, and therefore somewhat thermoplastic in nature.

The second prepolymer component is formed using higher ratios of aldehyde to phenolic, amine or urea, so that the resulting prepolymer is formed from monomer having a functionality of greater than two, and possibly approaching three. This prepolymer has an almost totally thermosetting characteristic.

In forming the phenolic-aldehyde resins, the linenar, non-crosslinkable component (hereinafter referred to as component "A") is formed by condensing 0.5 : 1 to 1.5 : 1 aldehyde to phenolic (mole ratio), and preferably a mole ratio of 0.8 : 1 to 1.2 : 1. The condensation reaction is conducted in water using an alkali catalyst. Any base may be used for this reaction, such as the alkali metal bases or alkaline salts, for instance the carbonates or hydroxides of sodium, potassium, lithium, barium, calcium, or magnesium. Ammonium hydroxide or carbonate may also be used. Sodium hydroxide is most commonly used. Water is most commonly used as the reaction medium, and may be present in amounts of from 25% to 75%. Most preferred to 50 to 60% water based on the total weight of the mixture.

The quantity of catalyst and temperature conditions are maintained such that an "A" stage prepolymer is formed having a viscosity at 25°C of 5 cps to 75 cps and preferably from 10 cps to 25 cps. The temperature of this initial reaction is from 60°C to reflux (approximately 100°C).

The thermosetting prepolymer component (hereinafter referred to as component "B") is prepared similarly to component A, except that the reaction is best conducted at lower temperatures, i.e., 30°C - 75°C. The mole ratio of the aldehyde to phenolic is from 2.0 : 1 to 3.0 : 1 and preferably in the range of 2.4 : 1 to 2.8 : 1. The viscosity of this prepolymer is the same as above.

The prepolymers are admixed and additional amounts of base are added to the mixture. The temperature is raised to from 60°C to the reflux temperature (approximately 100°C) and co-condensation of the prepolymer components is effected until the resin is converted into the "B" stage. The viscosity of the condensation copolymer may usefully be from 30 to 3,000 cps at 25°C but preferably, for use in plywood glue mixes, is from 300 – 1,000 cps at 25°C.

The quantity of base used in the copolymerization co-condensation reaction will usually be from about 0.05 to 0.80 moles per mole of phenol. The exact quantities, of course, will depend upon the particular base selected, and the particular resin property sought. The total mole ratio of base used, with respect to the phenol, is 0.1 : 1 to 1 : 1.

Alternative to the above procedure, prepolymer component A or B can be admixed with the components used for forming the opposite component B or A (without actual preparation of the other component). Condensation reaction conditions are then effected, with the exception that the temperature is maintained at below 70°C until all of the formaldehyde is reacted. The reaction is continued until the desired final resin viscosity is attained.

The ratio of the essentially thermoplastic component A to thermosetting component B may be from 90% A and 10% B which would be a high dry flow resin, to 90% B and 10% A which would be a highly thermosettable resin. Good results are obtained when the ratio of A to B is 0.5 : 1 to 1.5 : 1. Equal proportions of A and B provide a resin which is well adapted for adhesive usage in the plywood industry due to its good dry flow properties, and to its excellent tack and bonding ability.

The product will contain water in a quantity of 25 to 75% by weight as determined by the difference based on the amount of non-volatiles in the product.

The copolymer product may be admixed with any of a variety of fillers for viscosity control. For instance, suitable fillers include wood flour, wheat flour, walnut shell flour, acid extracted corn cob flour, fir bark, lignin or the like. Also various extenders, wetting agents or solvents, may be added to the product to improve its working properties and bonding ability. Suitable solvents, in addition to water, include the lower alkanols having 1 – 6 carbon atoms, methylethylketone, methylisobutylketone, acetone or ethyl acetate.

Additional amounts of sodium hydroxide or other base may be included in the product adhesive, as a solvent to adjust the viscosity of the resin, or as a catalyst for the subsequent curing of the adhesive.

The adhesive of this invention is characterized by an outstanding resistance to bond dryout, probably due to its combination of good bonding properties and good dry flow properties. These adhesives can thus be quite advantageously used for bonding of softwoods, such as the southern pines, currently widely used for plywood manufacture and could result in the use of less adhesive with stronger bonding. They can also be used for preparing bonded particleboards, hardboards, softboards or other cellulosic fiber products. The adhesive may also be used for ceramics, leather or the like. Moreover, the resins of this invention may be used as bonding agents for preparing green foundry sands for sintering.

In using the adhesive of this invention, the quantity which must be used will, of course, depend upon the particular materials being bonded, the particular composition, and the particular structure being formed. In laminating wood, for example, a total spread of from 25 to 60 pounds per thousand square feet of surface is preferred.

After the substrates to be bonded are coated, the substrates are joined and pressure is applied. The pressure may vary from contact pressure to about 2,000 psi. The pressures used for plywood formation are usually in the range of 150 – 250 psi, but particleboard press closing pressures are higher (300 – 600 psi depending on board density) and high pressure decorative laminate (e.g. "Formica") are bonded with pressure up to 1,500–2,000 psi. The temperature used will determine the cure rate, and commonly temperatures of from 65°F to 400°F are used.

In bonding, the resin is converted to the infusible, highly cross-linked "C" stage, and it has been found that the cured adhesive of this invention provides an exceptionally strong bond, without the extreme problems of bond dry out frequently experienced with other types of adhesives used for the same purposes.

The adhesive of this invention is thus characterized by a combination of the completeness of cure and speed of cure which is characteristic of the thermosetting component prepolymer B, and the fusible, dry flow properties which are characteristics of the essentially thermoplastic component prepolymer A. Surpisingly, as will be shown below, this combination is only attained when components A and B are copolymerized. If they are merely admixed, the resulting adhesive is inadequate.

Having now generally described the invention, a more detailed understanding of the invention can be attained by reference to certain specific examples which are provided herein for purposes of illustration only and are not to be construed as limiting unless otherwise specified. Unless otherwise indicated, all percents, parts and proportions are by weight.

EXAMPLE 1

Pre-polymer A (Essentially Thermoplastic)

Ingredients and proportions (by steps of addition to the resin kettle)

| | |
|---|---|
| 1. 90% liquid phenol (10% water) | 37.03% |
| 2. 95% Paraformaldehyde (5% water) | 11.20% |
| 3. Water | 46.10% |
| 4. 50% aqueous NaOH solution | 5.67% |
| (mole ratio formaldehyde to phenol = 1 : 1; mole ratio of NaOH to phenol = 0.2 : 1) | |

Order of ingredient addition and related cooking procedures used

1. Load items No. 1, 2 and 3 and add a small amount of 50% NaOH solution to dissolve the paraformaldehyde.
2. Raise reaction temperature to 50° – 55°C and add item No. 4.
3. Raise reaction temperature to 90° – 95°C and react for 30 minutes.
4. Lower reaction temperature to 80° – 85°C and react for about 60 minutes.
5. Cool to room temperature.

Pre-polymer B (Thermosettable)

Ingredients and proportions (by steps of addition to the resin kettle)

| | |
|---|---|
| 1. 90% liquid phenol | 27.19% |
| 2. 95% Paraformaldehyde | 21.39% |
| 3. Water | 47.26% |
| 4. 50% aqueous NaOH solution | 4.16% |
| (mole ratio of formaldehyde to phenol = 2.6 : 1; mole ratio of NaOH to phenol = 0.2 : 1) | |

Order of ingredient addition and related cooking procedures used

1. Load items No. 1, 2 and 3 and add a small amount of 50% NaOH solution to dissolve the paraformaldehyde.
2. Heat mixture to 60° – 65°C to assist dissolving of paraformaldehyde and then add item No. 4.
3. Lower reaction temperature to 50° – 55°C and react for 120 minutes.
4. Lower reaction temperature to 45° – 50°C and react for an additional 60 minutes.
5. Cool to room temperature.

Copolymerization of pre-polymers A and B

Ingredients and proportions (by steps of addition to the resin kettle)

| | |
|---|---|
| 1. Pre-polymer A | 46.90% |
| 2. Pre-polymer B | 46.90% |
| 3. 50% aqueous NaOH solution | 1.69% |
| 4. 50% aqueous NaOH solution | 4.51% |

Order of ingredient addition and related cooking procedures used

1. Load items 1, 2 and 3 and heat to reaction temperature of 85° – 87°C.
2. React at 85° – 87°C until the resin formed reaches a viscosity of 600 – 700 cps (measured at 25°C).
3. Lower reaction temperature to 75° – 80°C, add item No. 4 and react at 78° – 80°C until resin formed reaches a viscosity of 400 – 500 cps (measured at 25°C).
4. Cool to room temperature.

EXAMPLE 2

Ingredients and proportions (by steps of addition to resin kettle)

| | | |
|---|---|---|
| 1. | Pre-polymer A from Example 1 | 46.90% |
| 2. | Ingredients to form pre-polymer B (see Example 1) in amounts to yield the noted weight % in the overall mixture | 46.90% |
| 3. | 50% aqueous NaOH solution | 1.69% |
| 4. | 50% aqueous NaOH solution | 4.51% |

Order of ingredient addition and cooking procedures used

1. Either load pre-polymer A from storage into kettle or continue immediately after its preparation in the kettle.
2. Load ingredients for equivalent of pre-polymer B (see ingredients in Example 1) and follow pre-polymer B, steps 2 through 4 from cooking detail in Example 1.
3. Follow procedure for loading of ingredients 3 and 4 above and associated copolymerization cooking detail steps 2, 3 and 4 from Example 1.

EXAMPLE 3

Ingredients and proportions (by steps of addition to resin kettle)

| | | |
|---|---|---|
| 1. | Pre-polymer B (from Example 1) | 46.90% |
| 2. | Ingredients to form pre-polymer A (see Example 1) in amounts to yield the noted weight % in the overall mixture | 46.90% |
| 3. | 50% aqueous NaOH solution | 1.69% |
| 4. | 50% aqueous NaOH solution | 4.51% |

Order of ingredient addition and cooking procedures used

1. Either load pre-polymer B from storage into the kettle or continue immediately after its preparation in the kettle.
2. Load ingredients for equivalent of pre-polymer A (see Items 1, 2, 3 and 4 for pre-polymer A from Example 1) and follow pre-polymer A steps 2 through 4 from Example 1.
3. Follow procedure for loading of ingredients 3 and 4 above and associated copolymerization cooking detail steps 2, 3 and 4 from Example 1.

COMPARISONS 1 – 3

For comparison, a similar homopolymer resin was prepared having a mole ratio of formaldehyde to phenol of 1.9 : 1, sodium hydroxide to phenol of 0.5 : 1 with initial cooking at about 60° – 70°C followed by cooking at 80° – 90°C to a final 25°C resin viscosity of about 400 – 600 cps. Tests were conducted on three-ply, ⅜ inch thick southern pine plywood panels using a typical commercial veneer. The comparative evaluations have been in three test series as follows:

TEST SERIES NO. 1:

Veneer was heated to about 65°C (150°F) at a moisture content of about 1.5%. Glue mix applied at rate of 85 pounds per thousand square feet of double glueline (lbs/MDGL), which is a common plywood industry spread rate. Panels were pressed for 5 minutes using a platten temperature of 300°F and panel pressure of 200 psi. Assembly times were varied, using 10, 20, 40 and 80 minutes. Tests were carried out according to the industry method (% wood failure on vacuum - pressure treated plywood shear specimens as recorded in PS-1-66), and results were as follows:

TABLE I

| Resins | Assembly Times | | | |
|---|---|---|---|---|
| | 10 min. | 20 min. | 40 min. | 80 min. |
| Phenolic | 71* | 96 | 16 | 3 |
| homopolymer | 87 (77)** | 67 (78) | 4 (11) | 0 (1) |
| control | 74 | 70 | 12 | 0 |
| Anti-dryout | 71 | 79 | 26 | 68 |
| commercial | 98 (82) | 82 (82) | 71 (53) | 8 (44) |
| phenolic resin | 92 | 86 | 63 | 56 |
| Example 1 | 93 | 91 | 57 | 58 |
| | 96 (87) | 80 (84) | 74 (66) | 19 (46) |
| | 73 | 80 | 66 | 61 |

*Panel average (5 specimens)
**Triplicate panel averages

These values are percentages of wood failure appearing in the bonded area when destructively tested. A value of 100% would be very good and would suggest that the glueline was definitely stronger than the wood. Industry standards call for panel averages to be 80 or 85% minimum depending upon the application. In Table I, it is noted that both the antidryout commercial resin and the adhesive of Example 1 show similar performance and are apparently superior to the control homopolymer.

Because of the harshness of conditions with the hot, dry veneer in test series No. 1, tests were repeated including more reasonable veneer conditions. Test series No. 2 was carried out with a fresh batch of the Example 1 resin being made and again compared to the antidryout resin. Panels were made with both hot dry veneer and with room temperature veneer at a more moderate moisture content of 5%. Plywood shear test wood failure results are presented in Table II.

These data show the superiority of the adhesive of Example 1 as compared with the other resins, especially on the hot veneer.

TABLE II

| Resins | Veneer Condition | Assembly Times | | | |
|---|---|---|---|---|---|
| | | 10 min. | 20 min. | 40 min. | 80 min. |
| Phenolic | Room Temp. | 74* | 93 | 91 | 85 |
| Homopolymer | m.c. = 5% | 87 (80)** | 98 (90) | 69 (81) | 82 (81) |
| control | | 80 | 80 | 82 | 71 |
| | Hot (150°F) | 68 | 69 | 10 | |
| | m.c. = 1.5% | 52 (68) | 76 (63) | 25 (15) | |
| | | 84 | 43 | 9 | |
| | Room Temp. | 75 | 100 | 93 | 90 |
| | m.c. = 5% | 98 (90) | 87 (94) | 85 (88) | 92 (88) |
| Antidryout | | 96 | 95 | 87 | 83 |
| Phenolic | Hot (150°F) | 100 | 90 | 71 | |
| Resin | m.c. = 1.5% | 82 (88) | 65 (83) | 23 (61) | |
| | | 81 | 93 | 88 | |
| | Room Temp. | 86 | 94 | 92 | 90 |
| | m.c. = 5% | 83 (86) | 96 (89) | 84 (90) | 95 (92) |
| Example 1 | | 88 | 78 | 93 | 91 |
| | Hot (150°F) | 97 | 83 | 89 | |
| | m.c. = 1.5% | 90 (94) | 97 (89) | 83 (88) | |
| | | 96 | 86 | 93 | |

*Panel averages (5 specimens)
**Triplicate panel averages

Next the resin cure rate and resultant minimum hot press time requirements were compared. The data indicates, as shown in Table III, that the dry flow character of the adhesive of Example 1 does not slow the cure rate, as might have been expected. Samples of the adhesive of Example 1 and the control homopolymer resin, were used to make test panels using a 20 minute assembly time and room temperature veneer (5% moisture content) to accentuate any cure problems. The tests suggest that the adhesive of Example 1 cures at about the same rate as the other resin. Commercial press times in southern pine plywood mills would be about 3 minutes for ⅜ inch thick panels.

TABLE III

| Resin | Press Time | | |
|---|---|---|---|
| | 3 min. | 4 min. | 5 min. |
| Phenolic | 87* | 88 | 84 |
| Homopolymer | 60 (78)** | 76 (84) | 92 (86) |
| Control | 86 | 89 | 83 |
| Example 1 | 81 | 69 | 85 |
| | 93 (86) | 97 (84) | 96 (93) |
| | 84 | 87 | 98 |

*Panel average (5 specimens)
**Triplicate panel averages

COMPARISON 4

The copolymerization adhesive of this invention was then compared with simple mixtures of non-copolymerized components A and B. For this purpose, the disclosures of the Redfern U.S. Pat. No. 2,631,097 were relied upon. Comparison was made between the adhesive of Example 1 and Examples 1 and 9 of said patent. Both (a) walnut shell flour fillers and (b) acid extracted corn cob fillers (in combination with wheat flour) were used. In addition low (64 – 70 lbs/MDGL), and medium (82 – 86 lbs/MDGL) rates of adhesive application and assembly times of 10, 20, 40 and 80 minutes were used. The low spread is often more sensitive to dryout problems, and obviously dryout problems are amplified by longer assembly times.

Table IV clearly shows the superiority of the copolymerized components A/B over the adhesive of the Examples of said patent.

TABLE IV

| | | Fillers (F) | | | | | | | | | |
|---|---|---|---|---|---|---|---|---|---|---|---|
| | | Standard Filler Assembly Time (t) | | | | | Walnut Shell Filler Assembly Time (t) | | | | |
| Resins (R) | Spread Rates (S) | 10' | 20' | 40' | 80' | Ave | 10' | 20' | 40' | 80' | Ave |
| Example 1 A/B Copolymer | Low | 91.5 | 76.0 | 80.5 | 84.2 | 83.1 | 93.8 | 85.5 | 86.2 | 92.2 | 89.4 |
| Example 1 A/B Copolymer | Med | 88.0 | 94.5 | 92.5 | 86.5 | 90.4 | 82.2 | 91.0 | 86.5 | 88.0 | 86.9 |
| Example 1 of Redfern Patent (Physical blend A & B polymer) | Low | 66.0 | 61.8 | 40.8 | 57.5 | 56.5 | 72.0 | 63.5 | 68.0 | 72.0 | 68.9 |
| Example 1 of Redfern Patent (Physical blend A & B polymer) | Std | 65.0 | 82.0 | 64.8 | 85.2 | 74.2 | 54.2 | 76.8 | 77.2 | 86.5 | 73.7 |
| Example 9 of Redfern Patent | Low | 62.0 | 67.8 | 33.0 | 31.2 | 48.5 | 68.0 | 48.5 | 30.8 | 68.0 | 53.8 |
| Example 9 of Redfern Patent | Std | 73.5 | 70.0 | 48.5 | 43.0 | 58.8 | 84.0 | 81.2 | 64.5 | 64.8 | 73.6 |

Basic numbers are averages of 24 specimens (12 from each of two duplicate test panels)

As indicated in the footnote, the basic, individual data cell entries are percentage wood failure averages for 24 standard plywood shear specimens (12 from each of two duplicate panels) tested for exterior glueline quality per the vacuum-pressure watersoak procedure in Department of Commerce Standard, PS-1-66, on Softwood Plywood. The results in this comparison, in particular, highlight the very desirable assembly time tolerance of the adhesive of Example 1 as compared to the others.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method for forming an aldehyde-phenolic condensation copolymer, which comprises:

forming an essentially linear and non-cross-linkable aldehyde condensation prepolymer having a viscosity of 5 cps to 75 cps at 25°C by reacting an aldehyde selected from the group consisting of formaldehyde acetaldehyde, benzaldehyde, propionaldehyde, butyraldehyde, furfuraldehyde, and mixtures thereof with a phenolic compound selected from the group consisting of phenol, resorcinol, xylenol and cresol in a mole ratio of aldehyde to phenolic compound of 0.5 : 1 to 1.5 : 1 in water in amounts of 25% to 75% based on the total weight of materials in the presence of a catalyst of the hydroxide or carbonate compounds of alkali metals or alkaline earth metals, ammonium hydroxide or ammonium carbonate;

forming a highly thermosettable and cross-linkable aldehyde condensation aldehyde condensation prepolymer having a viscosity of 5 cps to 75 cps at 25°C, by reacting said aldehyde with said phenolic compound in a mole ratio of aldehyde to phenolic compound of 2.0 : 1 to 3.0 : 1 in water in amounts of 25% to 75% based on the total weight of materials in the presence of said catalyst;

admixing from 90% – 10% by weight of said linear aldehyde prepolymer with 10% – 90% by weight of said highly thermosettable prepolymer; and copolymerizing said admixture at a temperature of 60°C to the reflux temperature in the presence of said base in amounts of 0.05 to 0.8 moles per mole of phenolic compound which results in a copolymer having a viscosity of 30 to 3,000 cps at 25°C.

2. The method of claim 1, wherein the mole ratio of said aldehyde to said phenolic compound in said highly thermosettable prepolymer ranges from 2.4 : 1 to 2.8 : 1.

3. The process of claim 1, wherein said prepolymers are phenolformaldehyde condensation polymers.

4. A method for forming an aldehyde-phenolic condensation copolymer, which comprises the steps of:

forming an essentially linear and non-cross-linkable aldehyde condensation prepolymer having a viscosity of 5 cps to 75 cps at 25°C by reacting an aldehyde selected from the group consisting of formaldehyde, acetaldehyde, benzaldehyde, propionaldehyde, butyraldehyde, furfuraldehyde, and mixtures thereof with a phenolic compound selected from the group consisting of phenol, resorcinol, xylenol and cresol in a mole ratio of aldehyde to phenolic compound of 0.5 : 1 to 1.5 : 1 in water in amounts of 25% to 75% based on the total weight of materials in the presence of a catalyst of the hydroxide or carbonate compounds of alkali metals or alkaline earth metals, ammonium hydroxide or ammonium carbonate;

condensing from 90% – 10% by weight of said linear and non-cross-linkable aldehyde condensation prepolymer with 10% – 90% by weight of the components of a highly thermosettable and cross-linkable aldehyde condensation prepolymer of an aldehyde and a phenolic compound in the presence of said catalyst in 25% to 75% water based on the total weight of materials at a temperature less than 70°C until all of said aldehyde has reacted, wherein the mole ratio of said aldehyde and phenolic compound is 2.0 : 1 to 3.0 : 1; and continuing said condensation reaction until a copolymer is obtained having a viscosity of 30 to 3,000 cps at 25°C.

5. A method of forming an aldehyde-phenolic condensation copolymer, which comprises the steps of:

forming a highly thermosettable and cross-linkable aldehyde condensation prepolymer having a viscosity of 5 cps to 75 cps at 25°C by reacting an aldehyde selected from the group consisting of formaldehyde, acetaldehyde, benzaldehyde, propionaldehyde, butyraldehyde, furfuraldehyde and mixtures thereof with a phenolic compound selected from the group consisting of phenol, resorcinol, xylenol and cresol in a mole ratio of aldehyde to phenolic compound of 2.0 : 1 to 3.0 : 1 in water in amounts of 25% to 75% based on the total weight of materials in the presence of a catalyst of the hydroxide or carbonate compounds of alkali metals or alkaline earth metals, ammonium hydroxide or ammonium carbonate;

condensing from 10% – 90% by weight of said highly thermosettable prepolymer with 90% – 10% by weight of the components of an essentially linear and non-cross-linkable aldehyde condensation prepolymer of an aldehyde and a phenolic compound in the presence of said catalyst in 25% to 75% water based on the total weight of materials at a temperature less than 70°C until all of said aldehyde has reacted, wherein the mole ratio of said aldehyde and phenolic compound is 0.5 to 1.5 : 1; and continuing said condensation reaction until a copolymer is obtained having a viscosity of 30 to 3,000 cps at 25°C.

* * * * *

UNITED STATES PATENT AND TRADEMARK OFFICE
CERTIFICATE OF CORRECTION

PATENT NO. : 3,927,140
DATED : December 16, 1975
INVENTOR(S) : JAMES T. RICE ET AL It is certified that error appears in the above—identified patent and that said Letters Patent are hereby corrected as shown below:

Column 2, line 41, "essential" should read --essentially--.

Column 8, line 47, "specifmens" should read --specimens--;
line 60, "64-70" should read -- 65-70 --.

Column 9, line 54, delete one "aldehyde condensation".

Signed and Sealed this

Sixth Day of July 1976

[SEAL]

Attest:

RUTH C. MASON
Attesting Officer

C. MARSHALL DANN
Commissioner of Patents and Trademarks